United States Patent [19]

Bremley

[11] Patent Number: 5,251,573
[45] Date of Patent: Oct. 12, 1993

[54] DISPOSABLE PET LITTER CONTAINER

[75] Inventor: Mark B. Bremley, St. Louis, Mo.

[73] Assignee: Sean P. McGivern, Edwardsville, Ill.; a part interest

[21] Appl. No.: 941,718

[22] Filed: Sep. 8, 1992

[51] Int. Cl.5 .............................. A01K 29/00
[52] U.S. Cl. .................................. 119/168
[58] Field of Search ............ 119/165, 166, 167, 168, 119/169, 170; 220/408, 410, 441; 229/207, 242

[56] References Cited

U.S. PATENT DOCUMENTS

| | | | |
|---|---|---|---|
| 3,899,079 | 8/1975 | Seiter | 229/242 X |
| 4,305,544 | 12/1981 | Noonan | 119/168 X |
| 4,449,633 | 5/1984 | Johnson et al. | 229/242 X |
| 4,541,360 | 9/1985 | Higgins et al. | 119/168 |
| 4,627,382 | 12/1986 | Muzzey | 119/165 |
| 4,932,360 | 6/1990 | O'Connor | 119/168 |

Primary Examiner—Gene Mancene
Assistant Examiner—Thomas Price
Attorney, Agent, or Firm—Polster, Lieder, Woodruff & Lucchesi

[57] ABSTRACT

A disposable pet litter container is provided with a semi-rigid outer shell having a top wall, side walls, bottom walls and end walls, constructed in a general box-like configuration for containing a supply of granular absorbent material inside. A removable panel formed in the top wall is constructed with an off-set cut to allow the top panel and top wall to delaminate for separation and removal, in order to allow access to the material inside. The off-set cut also prevents leakage of the granular material or dust during shipping or storage. The container has a support structure constructed to fit within the outer shell to provide support and rigidity to the top wall, side walls and corners of the outer shell.

14 Claims, 4 Drawing Sheets

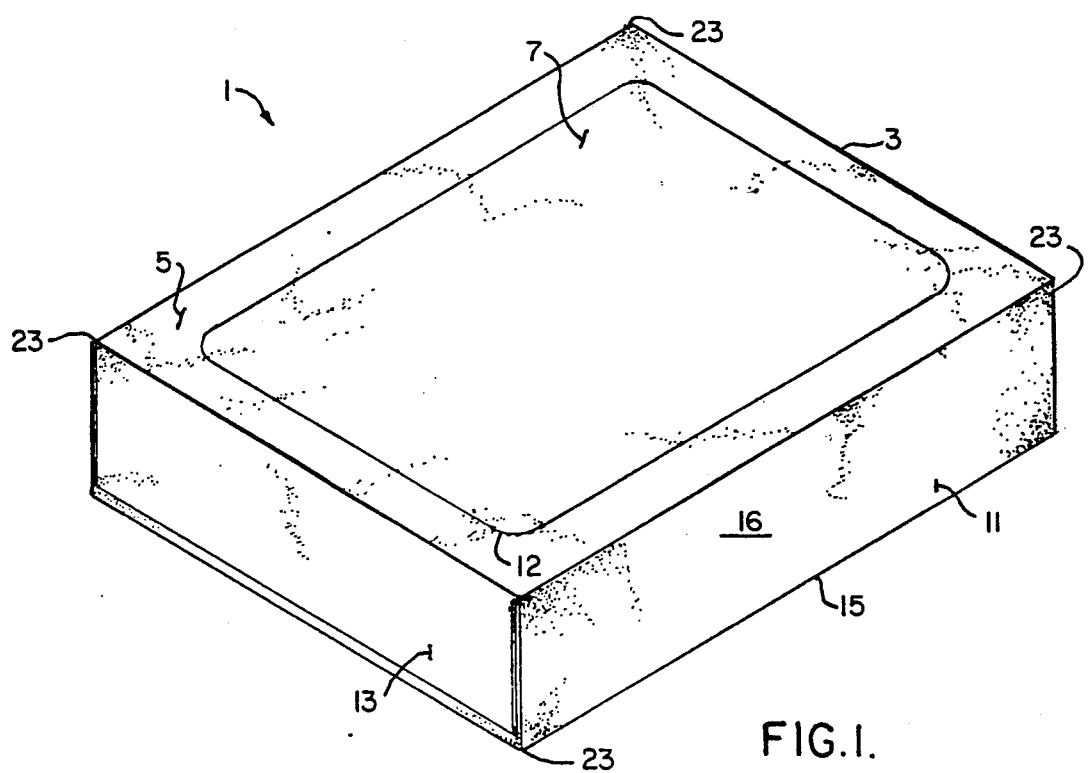
FIG.1.
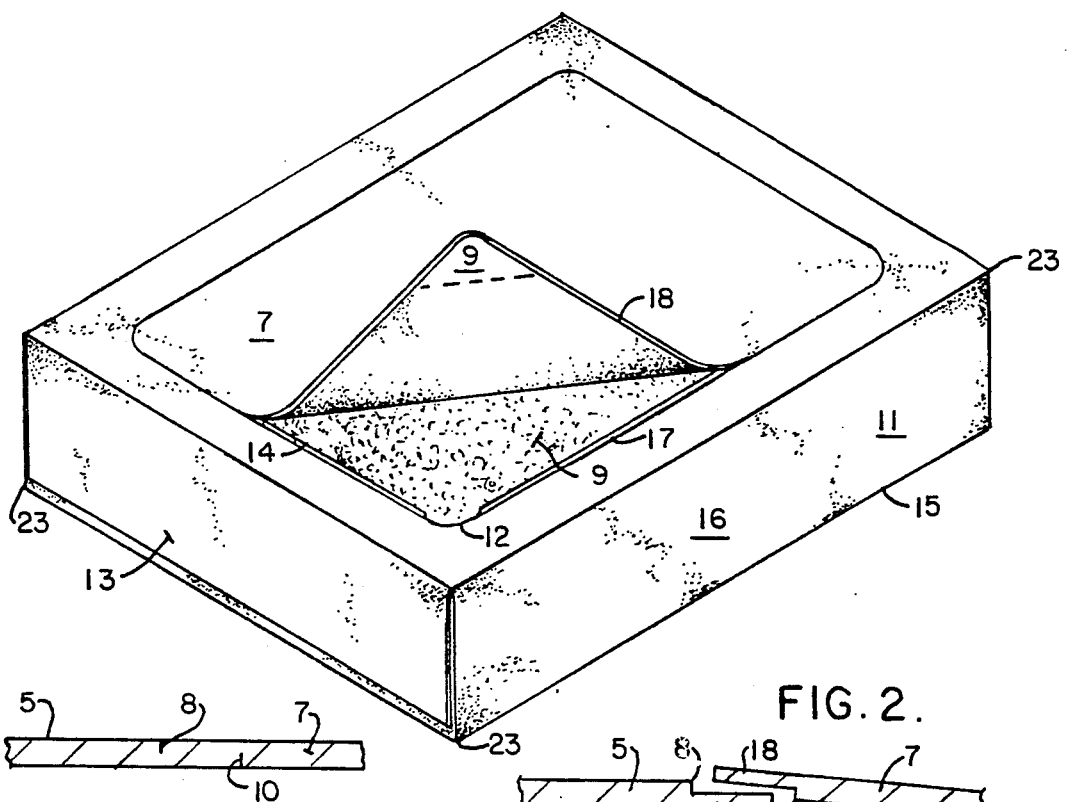
FIG.2.
FIG.3.
FIG.4.

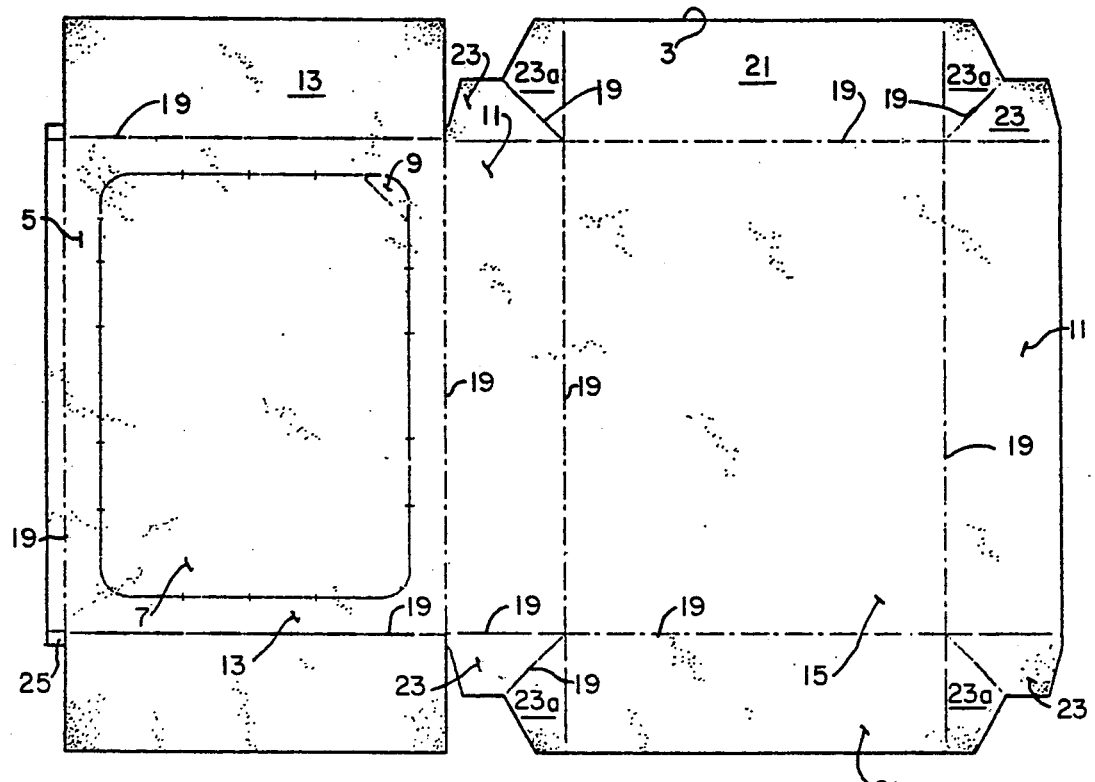
FIG.6.
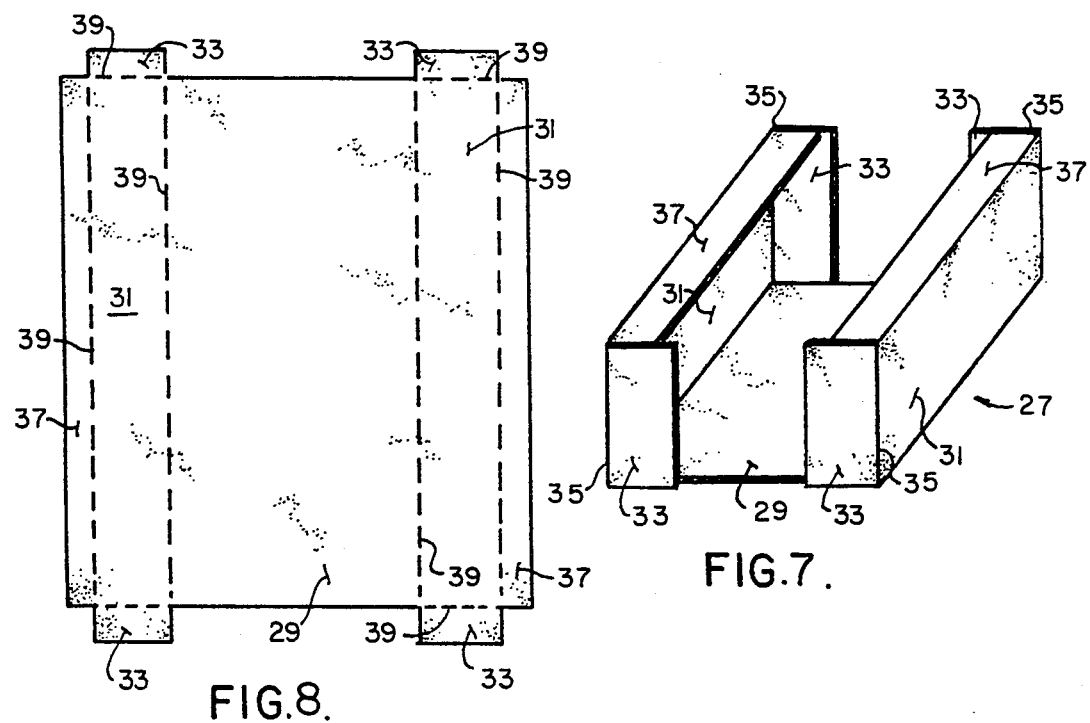
FIG.7.
FIG.8.

DISPOSABLE PET LITTER CONTAINER

BACKGROUND OF THE INVENTION

This invention relates to a pet litter box, and more specifically, to a disposable pet litter box which can be purchased by the consumer which is completely sealed with absorbent granular material inside and which can be easily opened to form a tray for access by the pet and then discarded when the granular material is saturated or malodorous.

Pet litter boxes are well known to the art. Pet owners, particularly cat owners, often provide a pet litter box filled with absorbent granular material in which the household pet can relieve itself. Often, these pet litter boxes are relatively sturdy boxes formed of a heavy plastic, metal or wood, in which the pet owner deposits the granular material. As the pet uses the litter box for urination and defecation, the granular material absorbs the moisture and most of the odor. The granular material becomes saturated and malodorous and must be removed and discarded and the box or container must then be cleaned and disinfected to remove any lingering odors or soil. Cleaning and disinfecting a pet litter box is an unpleasant task for pet owners and one that most pet owners would avoid if possible. It is, therefore, desirable to have a self-contained pet litter box having an adequate amount of granular absorbent material contained inside, a box that is waterproof to prevent leakage, widely openable to allow access by the pet, and disposable when the granular material becomes saturated so that the owner merely has to discard the entire container with granular material and waste inside and replace it with a fresh container. In order to construct such a disposable pet litter box that is sturdy, moisture resistant, and economical to use and discard, the container should be constructed of a moisture impervious, semi-rigid material such as laminated paperboard or cardboard and be economical to manufacture and non-wasteful to discard.

Many disposable pet litter boxes are known to the art. For example, U.S. Pat. No. 2,741,223 to Winborn discloses an animal commode having a shallow rectangular container, granular absorbent material enclosed therein, and a open top wall to allow access by the animal. U.S. Pat. No. 4,627,381 to Reed et al discloses a disposable tray and stand for holding litter whereby a lid is removable and serves to support the pan. U.S. Pat. No. 4,706,606 to Coppola discloses a disposable multiple litter tray assembly for use by cats and other small animals. The trays are made of pliable material and are stackable in the unused condition and separable for use with each of the stackable trays having its own granular litter material.

U.S. Pat. No. 4,731,111 to Runion discloses a disposable litter box designed to be placed within a permanent housing and withdrawn from the housing for use by the animal. U.S. Pat. No. 4,541,360 to Higgins et al discloses a disposable animal litter box having a bottom panel and side panels with a foldable corner assembly used to render the bottom container substantially fluid tight. U.S. Pat. No. 4,932,360 to O'Connor provides a disposable litter box and package consisting of a rectangular box, a bag, and an insert to hold the bag against the inner walls of the container.

U.S. Pat. No. 4,271,787 to Wellman et al discloses a disposable container having a plurality of self-contained litter boxes housed in a stacked relation within a container. Each of the litter boxes includes a removable top cover for removal to expose granular litter material inside. As each litter box becomes soiled, the box is removed from the container and disposed of and the cover of the subjacent box is removed to provide access for the animal. U.S. Pat. No. 4,711,198 to Mossbarger discloses a throw-away cat litter box having a lid hingedly attached to the base container, the lid can be lifted up to expose the granular litter material inside.

U.S. Pat. No. 4,441,451 to Neal discloses another disposable kitty litter box having a box bottom and a box top sized so that the box top can fit under the box bottom to serve an an additional moisture barrier for the bottom and lower side walls of the box bottom. U.S. Pat. No. 4,305,544 to Noonan et al also discloses a disposable cat litter holding means having foldable end flaps which cooperate with side wall means to create a foldable and secure disposable box. U.S. Pat. No. 4,164,314 to Edgar, discloses a single use disposable cat litter package formed of paperboard having vertical sides with a foldable top edge designed to fold inward from the side to form a horizontal top and having adhesive means for securing the top sections closed and a flexible bag containing cat litter.

U.S. Pat. No. 3,745,975 to Prucha discloses a disposable pet relief structure including a container having a cover that can serve as a pet dish tray when removed from the container in use. U.S. Pat. No. 4,553,671 to Cheesman discloses a tear-open, compartmented cat litter container having a top wall member with a central perforated tear out portion, inside walls and outside walls and a chamber filled with a predetermined amount of animal litter material. U.S. Pat. No. 3,886,901 to Zeitter discloses a folded cat box and filler material package with tears along the longitudinal center of the top panel so that the top panel can be separated and folded back to expose the litter sealed inside.

Although it can be seen that there are many disposable pet litter devices known to the prior art, there are also many drawbacks associated with the design of these boxes. For example, some of the boxes require folding by the user requiring complex assembly instructions. Often, prior art containers are constructed in a two-piece style having a lid portion that must be removed to expose the internal area of the container and a tray portion that must be repositioned and set in the lid to provide the proper rigidity and moisture proofing. Finally, previous designs require the use of large sheets of container material to provide the proper moisture proofing and rigidity and are therefore not economical to manufacture.

SUMMARY OF THE INVENTION

It is, therefore, and object of the present invention to provide a disposable pet litter container having a moisture-proof semi-rigid outer shell with a simple, economical interior support means.

It is a further object of the invention to provide a pet litter container that has a large, easily removable opening in the top wall to provide access to the internal litter material for the the pet.

It is a further object of the invention to provide a pet litter container that has a removable panel in the top that can be easily opened by pushing in with a finger and then peeling back a panel to expose the interior contents.

A still further object of the invention is to provide a disposable pet litter container having a removable top panel formed by cutting through approximately 50% (fifty percent) of the shell material from the outside creating the shape of the opening and cutting through approximately 50% (fifty percent) from the inside following the line of the outside cut, the interior cut being inset from the outside cut and creating an off-set area for delamination when the top panel is removed.

A further object of the invention is to provide a disposable pet litter container having an off-set cut removable panel that prevents leakage of granular material dust during shipping and storage.

A still further object of the invention is to provide a disposable pet litter box that is made of relatively inexpensive materials, is of simple construction, is economical to manufacture, and is well suited for its intended purpose.

Briefly stated, a disposable pet litter container is provided having an outer box-shaped shell of semi-rigid, moisture-proof laminated paperboard, the top wall of the shell having an off-set cut through half the depth of the top wall from the outside and half the depth of the top wall from the inside whereby the user can insert fingers into one corner and peel back delaminate and remove the access panel to expose the material inside the container for use by the pet. The container shell is supported by a corrugated paper support frame having a bottom wall of near the same dimensions as the bottom wall of the outside shell, and two side walls extending up vertically from the bottom wall to support the side walls of the shell and also having means to support the top wall of the outer shell. The corrugated support side walls have foldable corner extensions that are designed to support the corners and end walls of the outer shell. The disposable pet litter box has granular, absorbent material sealed inside.

BRIEF DESCRIPTION OF THE DRAWINGS

FIG. 1 is a perspective view of the disposable pet litter box of the present invention;

FIG. 2 is a perspective view of the disposable pet litter box of the present invention having the top access panel partially removed demonstrating the delamination and removal of the top panel and the granular absorbent material therein;

FIG. 3 is a partial cross-sectional view of the top wall of the disposable pet litter box of the present invention demonstrating the off-set cutting used to create the removable access panel; and FIG. 4 is a partial cross-sectional view of the top wall of the disposable pet litter container of the present invention showing the access panel pulled apart from the top wall.

FIG. 6 is a top plan of the outer shell of the disposable pet litter box of the present invention in an unfolded state demonstrating the configuration thereof;

FIG. 7 is a perspective view of the internal support structure of the disposable pet litter box of the present invention;

FIG. 8 is a top plan of the internal support structure of the pet litter box of the present invention in an unfolded state showing the configuration tnereof;

DESCRIPTION OF THE PREFERRED EMBODIMENT

Figure 5:
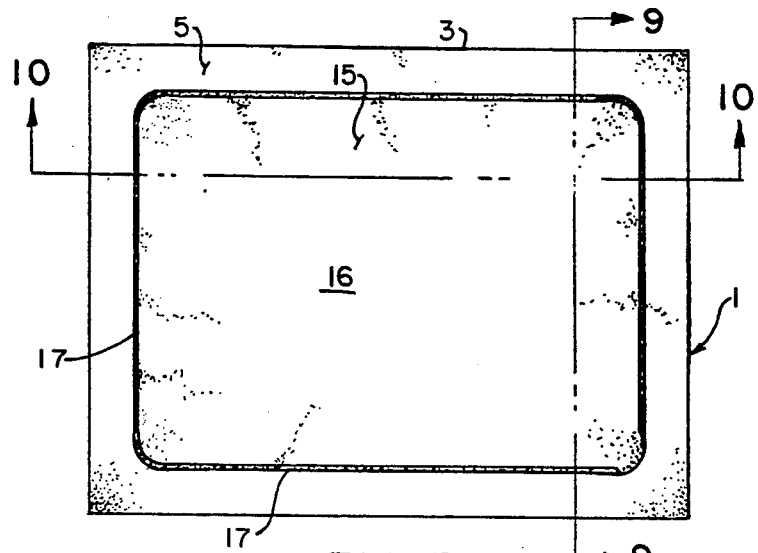
FIG. 5 is a top plan of the disposable pet litter box of the present invention, the access panel removed.

A disposable pet litter container of the present invention is shown generally at 1 in FIGS. 1 and 2. Container 1 is constructed of an outer shell 3 having a top wall 5 with a removable panel 7 formed therein, vertical opposing side walls 11 and vertical opposing end walls 13 which cooperate to form a box-like container defining chamber 16, and a bottom wall 15. The outer shell is constructed from an appropriate material such as a light-weight water-proof laminated paperboard or the like. Removable panel 7 is formed by a unique off-set cutting process that allows for sealing during transportation and delamination for removal, as will be explained hereinafter. Panel 7 has an opening corner 9 formed by standard perforations at corner 12 enabling the user to insert a finger to pull back and remove panel 7.

FIG. 2 illustrates container 1 in a partially opened state with panel 7 pulled back to expose the absorbent, granular material 9 housed within chamber 16. Granular material 9, sometimes known as cat litter, functions to absorb moisture and odors from urine or other animal waste when the pet uses the container. Container 1 is shipped to the consumer with a supply of granular material 9 inside and ready for use. To fully expose the granular material inside and to prepare the container for use by the pet, the user inserts a finger through opening area 9 and pulls entire panel 7 away from the top wall 5 to chamber 16 and granular material 9 for use by the pet. The panel 7 is then discarded.

As previously mentioned, panel 7 is formed in top wall 5 by a unique off-set cutting procedure that prevents accidental opening and leakage. FIG. 3 illustrates a partial cross sectional view of a section of top wall 5 and removable panel 7. A cut 8 is made outlining panel 7 half-way through top wall 5; a second off-set half-depth cut 10 is made half way through top wall 5 from the bottom. Cut 10 follows the outline of panel 7 but is inset approximately ⅛ inch from cut 8. This off-set cutting prevents cut 8 from directly joining and cooperating with cut 10 to prevent accidental rupturing and leakage of the contents of granular material or dust as can occur with standard perforations.

FIG. 4 illustrates the removal of panel 7 from top wall 5. When panel 7 is pulled away from top wall 5, the paperboard tears between cuts 8 and 10 resulting in delaminated area 17 around the edge of opening 14 and a delaminated area 18 remaining on the removed panel 7. See also FIG. 2 showing delaminated areas 17 and 18.

Continuing now with a detailed description of the container 1, the outer shell 3 is formed with a general box-like configuration having two vertical opposed side walls 11, two vertical opposed outer end walls 13, a top wall 5 and a bottom wall 15 (See FIGS. 5-6). Outer shell 3 is cut from a single sheet of appropriate paperboard material as shown in FIG. 6. Shell 3 has folding creases, as at 19, so that shell 3 can be folded into a desired shape. As shown in FIG. 6, the carton blank includes an interconnected bottom wall 15 has integral side walls 11, corner pieces 23 and 23a, and end walls 13. Top wall 5 is also integrally connected to one side wall 11 and has top panel 7 cut therein as previously explained. Top wall 5 has overlapping end walls 13 as well as securing flap 25 integrally formed thereon. Outer shell 3 is cut, folded and assembled for distribution and requires no assembly by the user. The relationship of the various parts of shell 3 will be explained in detail hereinafter.

To maintain its shape and rigidity when assembled, shell 3 is supported by an internal support structure that slides into chamber 16 shown generally at 27 in FIG. 7. Support 27 has a bottom support wall 29 of such dimensions so as to rest upon and cover bottom wall 15 of shell 3. Bottom wall 29 serves to reinforce bottom wall 15 of shell 3 and to provide an additional moisture barrier to prevent leakage. Bottom wall 29 has vertical side walls 31 integrally connected thereto and are of such dimension so as to fully abut and support side walls 11 of shell 3. Side walls 31 have extensions 33 integrally formed on each end thereof which are designed to be folded at right angles to wall 31 to form corners 35. Corners 35 nest in and support corner pieces 23 and 23a of shell 3 and further support the end walls of shell 3 as will be explained in more detail hereinafter.

In order to support to top wall 5 of shell 3, vertical walls 31 have horizontal extensions 37 integrally formed thereon and constructed so as to fold down at a right angle to each side wall 31 so as to abut the inside surfaces of top wall 5 of shell 3.

FIG. 8 illustrates support 27 prior to assembly. Support 27 is cut in one piece from a sheet of heavy corrugated paper or other appropriate material and is provided with folding creases as at 39 so that support can be folded into the desired configuration.

Figure 9:
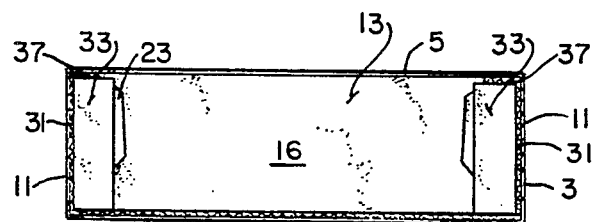
FIG. 9 is a cross-sectional view of the disposable pet litter box of the present invention taken along lines 9—9 of FIG. 5.

As stated above, support 27 is inserted into chamber 16 to give support and rigidity to shell 3. FIGS. 9-12 illustrate the relationship between outer shell 3 and inner support 27 in an assembled container to achieve that support. As shown in FIG. 9, bottom wall 29 of support 27 rests against bottom wall 15 of shell 3. Vertical side walls 31 of support 27 abut walls 11 of the shell and horizontal extensions or supports 37 are folded at right angles to wall 31 so as to abut inside top wall 5 and provide support thereto. Extensions 33 are folded at right angles to walls 31 to abut bottom wall 29 for enhanced rigidity and to abut corner pieces 23 and 23a to provide support to the corners.

Figure 10:
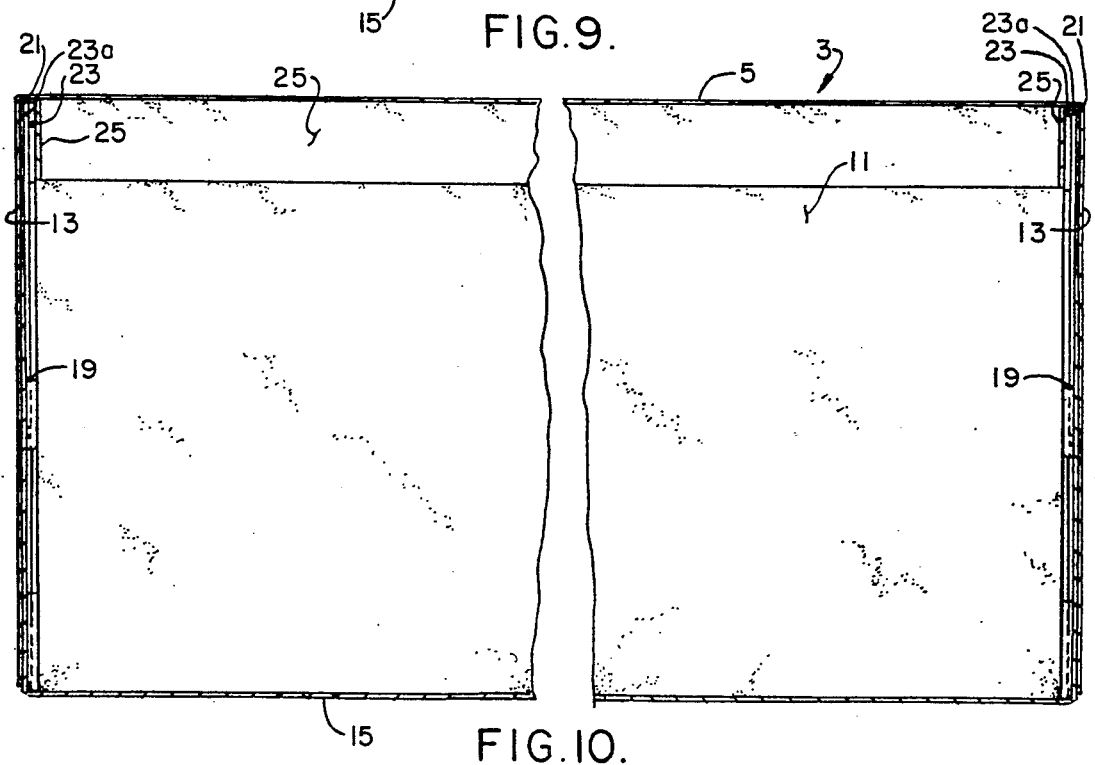
FIG. 10 is a cross-sectional view of the disposable pet litter box of the present invention taken along lines 10—10 of FIG. 5.

FIG. 10 illustrates the configuration and relationship of the previously described sections of outer shell 3 in an assembled configuration prior to the insertion of support 27. Support strip 25 is integrally formed from side wall 11 and folded at right angle to wall 11 and secured to corner piece 23 and the opposite side wall 11 by glue or other appropriate adhesive. Corner pieces 23 and 23a are folded along fold line 19 to form a corner with corner piece 23 abutting inner end wall 21. Outer end wall 13 comes down and over inner end wall 21 in a flap-like arrangement and is secured in place with an appropriate adhesive or glue to hold the end and corner assembly securely in place.

Figure 12:
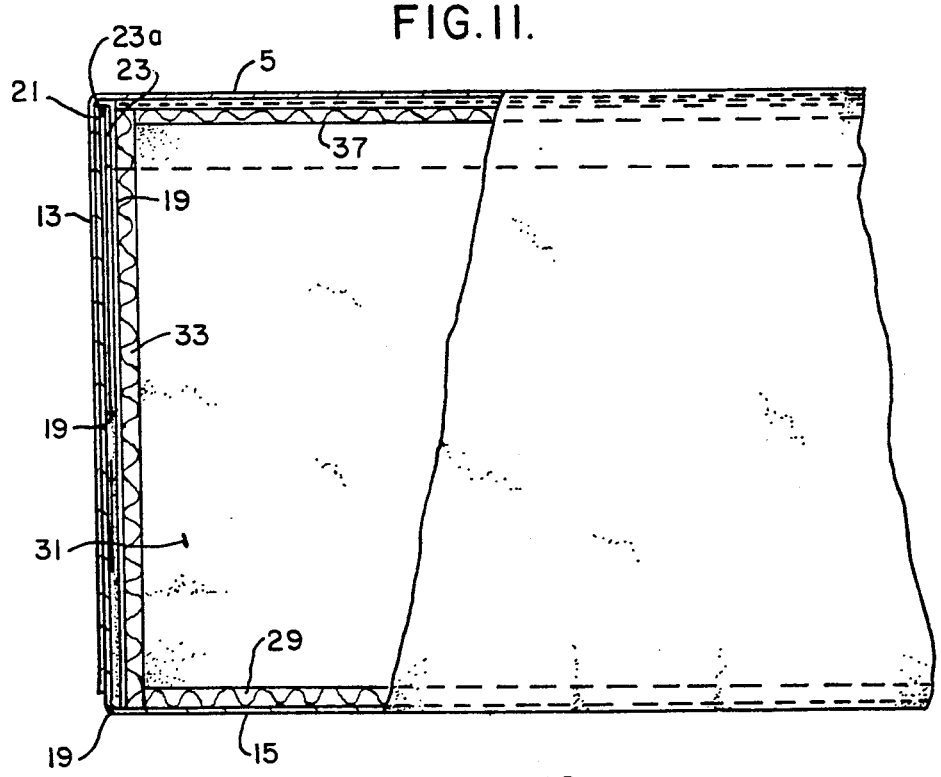
FIG. 12 is a partial cut away, side elevational view of the disposable pet litter box of the present invention showing the relationship between the folded portions of the outer shell and the internal support.

FIG. 12 is an enlarged, partial cross sectional view of shell 3 with support 27 inserted inside and illustrating the top, corner and end wall support arrangement of the present invention. Bottom wall 29 of support 27 rests against the bottom wall 15 of shell 3. Extensions 33 of support wall 31 are folded at a right angles to wall 31 and abut support bottom wall 29 to add rigidity and strength to the assembly. Corner piece 23a is folded along fold seam 19 at a right angle so as to abut extension 33. Corner pieces 23a is folded along fold line 19 to abut corner piece 23. Inner end wall 21 is folded upward along fold line 19 to abut corner piece 23a and outer end wall 13, which integrally extends from shell top wall 5 and is folded down and over inner wall 21 as previously explained.

Figure 11:
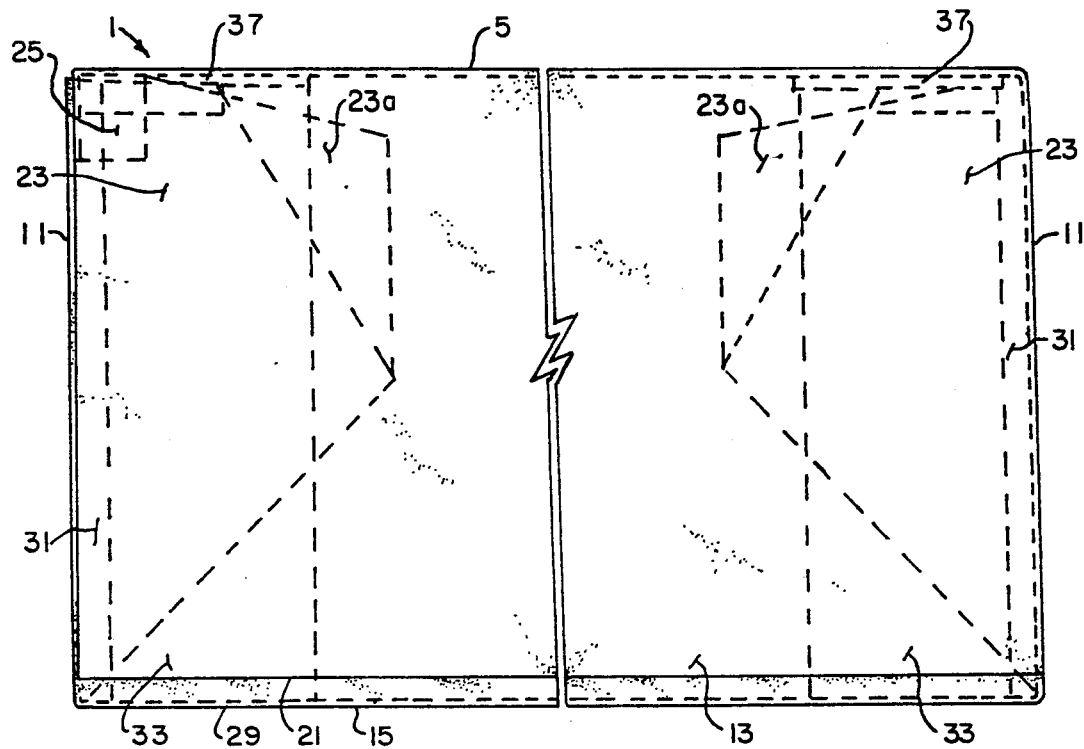
FIG. 11 is an elevational view of one end of the disposable pet litter tray of the present invention showing the relationship of the side components of the external shell and the internal support in a folded position.

FIG. 11 provides an end view illustrating the above explained relationship of the elements which cooperate to form a rigid end wall and corners for container 1. Extensions 33 are folded at a right angle as previously explained to abut support bottom wall 29. Corner sections 23a are folded against extensions 33 and corner sections 23 folded against corner section 23a. Inner end wall 21 is folded up and abuts corner section 23. Finally, outer end wall 13 is folded down to cover the end assembly and glued to secure the assembly in place. Securing flap 25 is folded at a right angle to side wall 11 (not shown) and to corner section 23 and glued with a suitable adhesive to completely seal the outer shell.

In lieu of an independent support 27 for the outer shell 3, the outer shell 3, made of paperboard material, can be attached to single face corrugated sheeting. Specifically, the single face corrugated sheeting is provided with an inner liner and a corrugated medium. The paperboard material outer shell 3 is attached by glue or other suitable bonding means to the corrugated medium, opposite the inner liner. In this type of construction, the outer shell 3 may have different folds, creases, etc., but would still retain the unique off-set feature with spaced cuts made half-way through the paperboard to prevent accidental opening, while providing an easy opening and removable top panel, as described above.

As illustrated, the unique outer shell and internal support assembly of the present invention provides for a light-weight yet reasonably rigid and durable disposable animal litter container that is economical to construct and well suited for its intended purpose.

Various changes or modifications may be made in the present invention without departing from the scope of the invention and the foregoing description and drawings are intended as illustrative and not in a limiting sense.

What is claimed is:

1. A disposable pet litter box comprising:
   a laminated moisture-proof outer shell having a bottom wall, side walls, end walls and a top wall generally opposed to said bottom wall; and,
   said top wall having a removable panel formed therein, said removable panel defined by a cut made approximately half-way through said outer shell from the outside creating the shape of said panel, and by a cut made approximately half-way through said top shell from the inside following the shape of said outside cut, the interior cut being in-set from the outside cut and creating an off-set cut area for delaminating said top between said cuts to allow removal of said removable panel.

2. The disposable pet litter box as defined in claim 1 wherein said moisture-proof outer shell is made from light weight laminated paperboard material.

3. The disposable pet litter box as defined in claim 2 wherein the moisture-proof outer shell is supported by independent support means within the outer shell.

4. A disposable pet litter container comprising:
- an outer shell formed from light weight, moisture-proof laminated paperboard having a bottom wall with two parallel and generally opposed side walls and end walls integrally connected to and extending upwardly therefrom, said side walls and said end walls also being integrally connected to each other and designed to cooperate with said bottom wall to form a chamber having four corners;
- a top wall generally opposed to said bottom wall and integrally attached to at least one of said side walls and end walls, said top wall having a removable panel formed therein to allow opening of said shell for access by a pet; and
- independent support means within said chamber to support said outer shell.

5. The disposable pet litter container of claim 4 wherein said outer shell is constructed in one piece from said light weight, moisture-proof laminated paperboard having a plurality of creases therein to enable folding of said one piece laminated paperboard into a desired shape.

6. The disposable pet litter container of claim 4 wherein said removable panel is formed in said top wall by cutting half way through said laminated paperboard from the outside creating the shape of said panel and by cutting half way through said laminated paperboard from the inside of said top wall following the shape of said outside cut, said interior cut being in-set from said outside cut and creating an off-set area of delamination between said inside and said outside cuts when said top panel is removed.

7. The disposable pet litter container of claim 4 wherein said independent support means further comprises a rigid corrugated paper support means inserted into said chamber.

8. The disposable pet litter container of claim 7 wherein said independent support means has a bottom wall constructed to rest against said bottom wall of said outer shell and a pair of opposed vertical side walls integrally connected to said bottom wall of said support means and constructed to abut said side walls of said outer shell to support said side walls of said outer shell.

9. The disposable pet litter container of claim 7 wherein each said vertical side wall of said independent support structure further comprises a first and second end, said first and second end each having lateral extensions integrally formed thereon and designed to be folded inwardly at right angles to said support walls and designed to abut and support said end walls of said outer shell and to abut and support said corners of said chamber.

10. The disposable pet litter container of claim 8 wherein each of said independent support structure side walls each have a horizontal section formed thereon, each said horizontal section designed to fold inwardly at a right angle to said side wall and parallel to said top wall of said shell and designed to abut said top wall of said shell thereby supporting said top wall of said shell.

11. The disposable pet litter container of claim 4 wherein said chamber contains a granular absorbent material.

12. A disposable pet litter container comprising:
- a moisture-proof laminated outer shell having a bottom wall, two parallel side walls integrally formed from said bottom wall and extending upwardly therefrom, two parallel end walls integrally formed from said bottom wall and extending upwardly therefrom, said side walls and said end walls cooperating with said bottom wall to form a chamber, said chamber having four corners;
- a top wall parallel to said bottom wall and being integrally attached to at least one of said side walls and end walls and having a removable panel formed therein to allow opening of said shell for access by a pet; and
- an independent support means within said container, said support means having a bottom wall and a pair of parallel side walls integrally connected to said bottom wall of said independent support means, said side walls having means thereon for supporting said top wall and said end walls of said outer shell.

13. The disposable pet litter container of claim 12 wherein said independent support means is constructed of a rigid, corrugated paper.

14. The disposable pet litter container of claim 15 wherein said means for supporting said side walls, said top wall, and said end walls of said shell further comprise said each vertical side wall of said independent support structure having two ends and a top edge, each said end having extensions formed thereon, said extensions being foldable at right angles to said support side walls thereby forming corner supports, said corner supports constructed to abut and support said corners of said chamber, each said top edge having an extension formed thereon, said extension being foldable at right angle to said side wall and constructed to abut said top wall.

* * * * *